Peter Embree
INVENTOR

Peter Embree
INVENTOR

BY *Melvin Sharp*
ATTORNEY

Peter Embree
INVENTOR

Sept. 20, 1966 P. EMBREE 3,274,541
SEISMIC VELOCITY FILTERING
Filed Feb. 15, 1963 9 Sheets-Sheet 6

Peter Embree
INVENTOR

BY Melvin Sharp
ATTORNEY

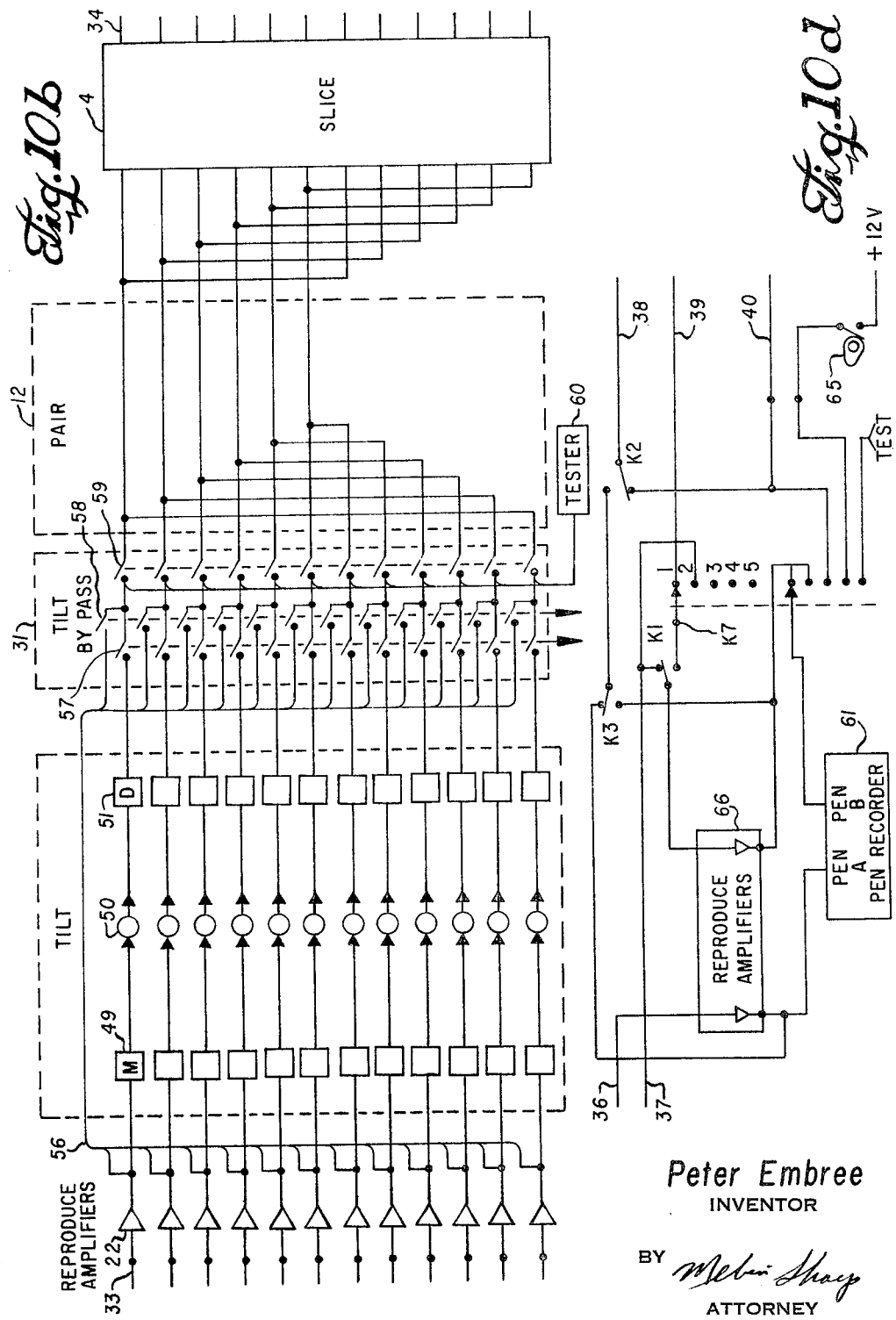

Peter Embree
INVENTOR

BY Melvin Sharp
ATTORNEY

Sept. 20, 1966   P. EMBREE   3,274,541
SEISMIC VELOCITY FILTERING
Filed Feb. 15, 1963   9 Sheets-Sheet 9

Peter Embree
INVENTOR

BY *Melvin Sharp*
ATTORNEY

United States Patent Office 3,274,541
Patented Sept. 20, 1966

3,274,541
SEISMIC VELOCITY FILTERING
Peter Embree, Farmers Branch, Tex., assignor to Texas Instruments Incorporated, Dallas, Tex., a corporation of Delaware
Filed Feb. 15, 1963, Ser. No. 258,782
26 Claims. (Cl. 340—15.5)

In geophysical prospecting it is common practice to use an array of seismometers to detect the seismic disturbance from an explosion detonated at or below the surface of the earth. The resulting seismic record is made up of a plurality of traces, the number of which corresponds to the number of seismometer locations or seismometer group locations. The record may then be interpreted with respect to signals in the traces, which signals have relative time delays across the record as though the time delay originated from a seismic wave propagating in the direction of the array. The slope of a line passing through corresponding features in each of the signals across the record is referred to as the dip and is expressed in terms of milliseconds per trace. The relationship between dip and the apparent velocity of the seismic wave is $V=d/\tau$ where $V$=the velocity of the seismic wave propagating in the direction of the array, hereinafter referred to as apparent velocity
$d$=seismometer spacing, feet $\times 10^{-3}$
$\tau$=milliseconds of dip/trace Seismic records generally are complicated. It is often difficult to distinguish between signals appearing at about the same record time but having different dips. To increase the intelligibility of the seismic record, the traces have heretofore been summed to produce a composite trace for enhancing waveforms aligned in time. This gives prominence to some features of the received seismic waves and often suppresses undesired features which otherwise obscure the important ones.

In the past, there have been two approaches to processing the traces prior to summation in order to enhance signal waveforms relative to noise in the composite trace. First the traces have been processed on a frequency basis by using electrical passband filters, which is referred to as frequency domain filtering. Second, the traces have been processed on a wavenumber basis using the spatial distribution of the seismometers in the array, which is referred to as wavenumber domain filtering.

However, neither type of filtering, frequency or wavenumber, separately or in tandem, is capable of separating desired and undesired seismic waves when these waves have apparent velocities such that their frequency and wavenumber spectra overlap within the frequency range of the desired wave since filtering on either basis would attenuate part of the trace representation of the desired wave.

Accordingly, it is an object of the invention to process the traces of a seismic record on a velocity basis and thereby preserve all signals in the traces resulting from seismic waves having an apparent velocity within a predetermined velocity range and attenuate all signals in the traces resulting from seismic waves having an apparent velocity outside said range. Seismic waves having overlapping frequency and wavenumber spectra within the frequency range of the desired waves are thus separated without suppressing part of the trace representation of the desired waves.

The invention, in a preferred embodiment, contemplates a method of and apparatus for processing seismic traces obtained from a linearly equispaced seismometer array to which are transmitted seismic waves having an apparent velocity in the direction of the array. Prior to compositing the traces, they are processed in a manner to result in a directed beam having a beam width substantially independent of frequency, thereby preserving trace representations of all seismic waves having an apparent velocity such that their direction of propagation is within the beam width, and attenuating trace representations of all seismic waves having an apparent velocity such that their direction of propagation is outside said beam width.

It should be understood that the traces to be processed according to the invention may be traces produced from a plurality of detectors receiving energy from a single shot, or may be traces produced by a single detector receiving energy from a plurality of spatially-separated shots (shot stacking). All that is required is that the traces to be processed have signals therein, which signals have relative time delays dipping across the traces as though they originated from a seismic wave, or similar physical disturbance, propagating in the direction of the detector locations. To this end, it is not necessary that the traces be sampled at a plurality of actually separate locations. For example, an equivalent result may be attained by sampling the traces at apparently separate locations. An equispaced linear detector array receiving energy from a shot exemplifies traces sampled at actual separate locations, while traces obtained from shot stacking exemplifies traces sampled at apparently separate locations. Hereinafter, reference to traces obtained from sampling seismic wave phenomena at separate locations includes actual, as well as apparent, separate locations, and reference to a detector array includes an apparent array resulting from shot stacking.

It should further be understood that the traces to be processed according to the invention may be electrical signals obtained directly from the detector outputs or electrical signals obtained from a magnetic storage means in which the original detector output signals are stored.

Each trace is a function of time and its spatial origin in the array. Velocity filtering is broadly accomplished by processing each trace according to predetermined parameters such as weights and time shifts related to the desired velocity passband. All of the processed traces are then summed to produce a composite output trace.

More particularly, and in order to set the cutoff velocities $V_{co}$ of the desired passband, each trace is processed by a two-point time domain operator which includes forward and backward or bidirectional time shifting of each trace in relation to the other traces. Stated mathematically in general terms, the trace $S(t,X)$ from each location X is operated on to produce a signal $g(t,X)$ proportional to $$\frac{1}{X}\left[S\left(t+\frac{X}{V_{co}},X\right)-S\left(t-\frac{X}{V_{co}},X\right)\right]$$

then summing the $g(t,X)$'s for all X. That is, each trace $S(t,X)$ is weighted as an inverse function of the location from which it was sampled (1/X) and separated into two channels, the trace in one of the channels being time shifted as a function of $X/V_{co}$, the trace in the other channel being time shifted as a function of $-X/V_{co}$, the trace in said other channel being also polarity reversed. All the time shifted and weighted traces are then composited to produce an output trace that gives prominence to trace representations of seismic waves having an apparent velocity within a predetermined velocity range.

As viewed from a frequency (f) versus wavenumber (K) plot of the seismic disturbance, processing according to the invention cuts a "pie slice" bounded by two cutoff velocities which define a velocity range so that trace representations of waves propagating with apparent velocities in the direction of the array outside the range are suppressed and representations of waves propagating with apparent velocities inside the range are passed. Additionally, a center velocity $V_c$ for the range passband may be chosen by time shifting signals from seismic waves having an apparent velocity $V_c$ so that the signals have zero milliseconds (ms.) of dip across the record. Waves having an apparent velocity $V_c$ would thus appear to have an infinite apparent velocity. With said signals bidirectionally time shifted, the velocity passband would be $V_c \pm V_{co}$. Therefore, processing according to the invention is capable of velocity filtering having a passband $V_c \pm V_{co}$ in $(f,K)$ space. As viewed from the seismic record, signals sloping across the record within a predetermined range of $\tau$ ms. of dip per trace are passed and those outside the range are attenuated.

As opposed to conventional processing in which the processing response has the same relative frequency response at all wavenumbers and the same relative wavenumber response at all frequencies, the overall processing response according to the invention has a wavenumber K response that varies with frequency $f$ and a frequency response that varies with wavenumber. Thus the processing response according to this invention is jointly responsive to $f$ and K to result in a velocity filter capable of separating waves having overlapping frequency and wavenumber spectra in the frequency range of the desired waves.

The foregoing and other objects, features and advantages of the invention will be apparent from the following detailed description taken in connection with the appended claims and attached drawings in which like numerals connote like parts and in which:

Figure 9:
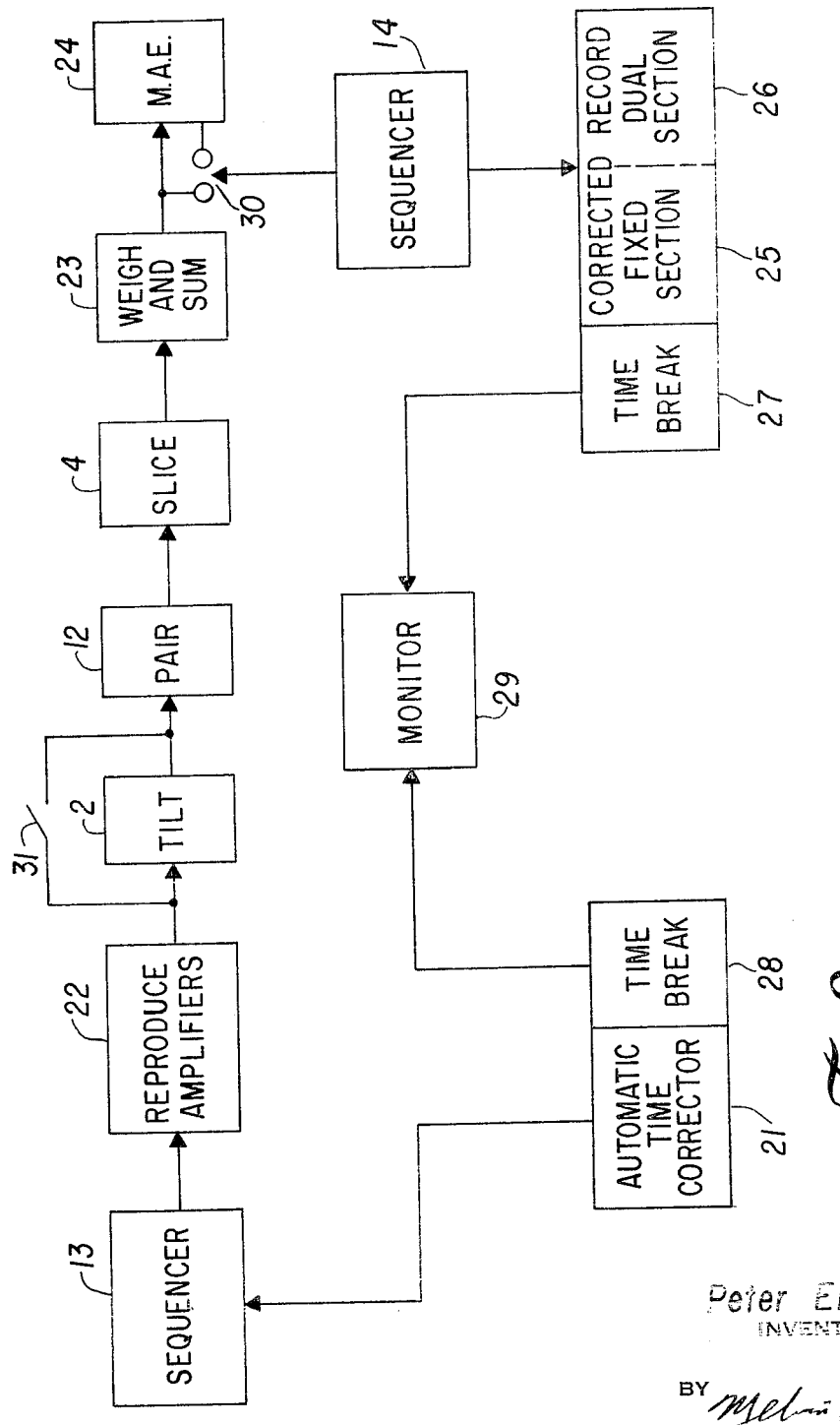
FIGURE 9 illustrates a functional block diagram of an embodiment of the invention.
Figure 11:
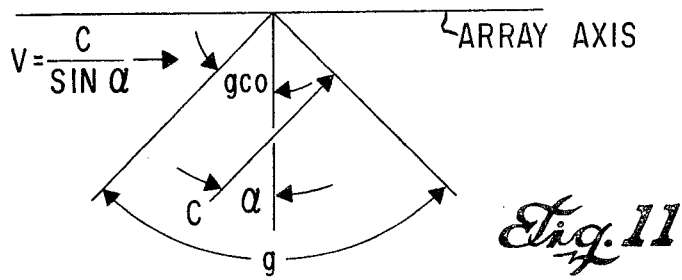
Figure 12:
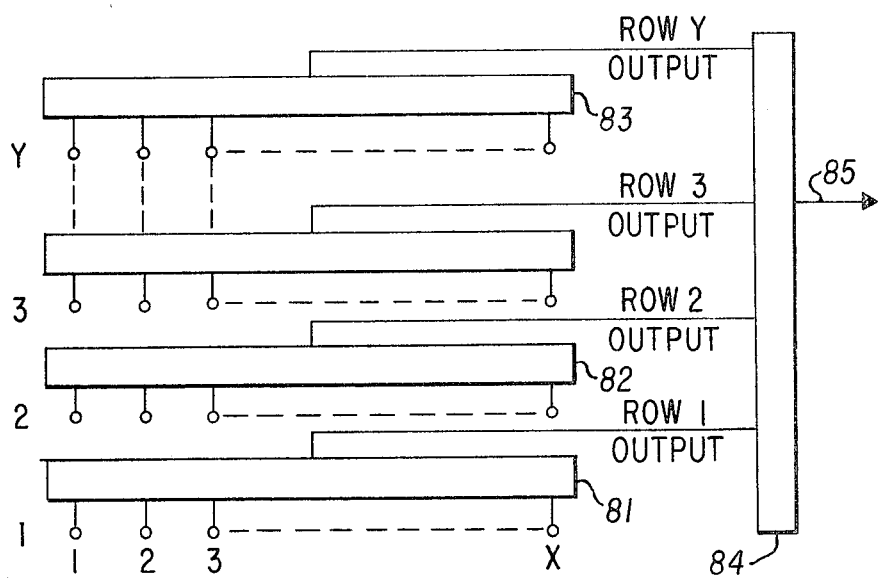
Figure 13:
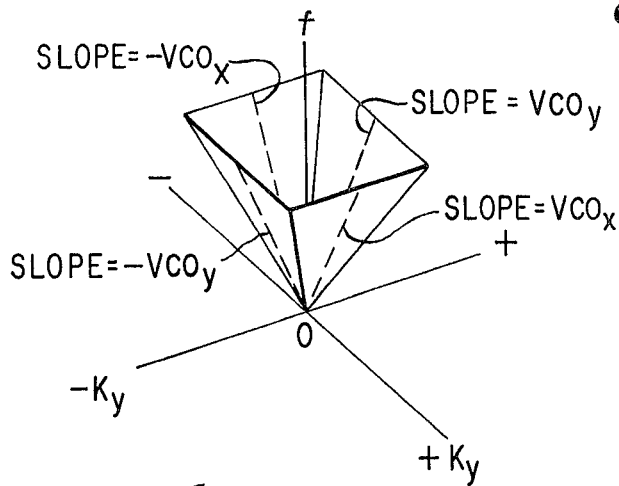

FIGURES 10A, 10B, 10C and 10D taken together show the signal paths in the embodiment of FIGURE 9;

FIGURE 11 illustrates the direction of propagation of an acoustic wave in relation to the axis of an array;

FIGURE 12 illustrates a two dimensional array of $xy$ detectors and two dimensional processing according to the invention;

FIGURE 13 illustrates a three dimensional $f,K$ space plot of the power spectra of seismic waves having apparent velocities $V_{cox}$, $-V_{cox}$, $V_{coy}$ and $-V_{coy}$.

Figure 1:
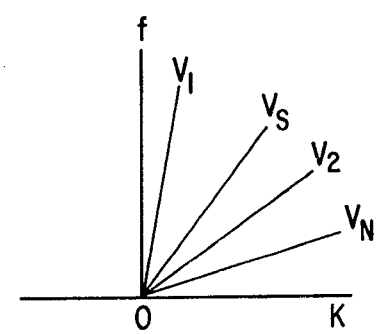
FIGURES 1 and 2 illustrate an $f,K$ space plot showing the frequency and wavenumber locations of the power spectra of seismic waves.
Figure 2:
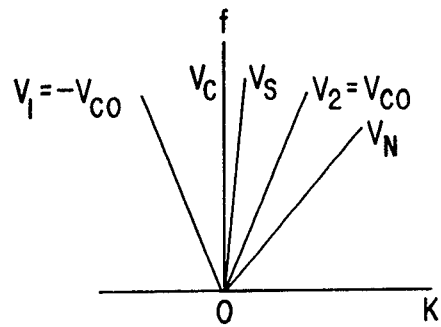

FIGURE 1 illustrates an $f,K$ space plot of seismic waves wherein the lines $V_1$ and $V_2$ represent the frequency and wavenumber locations of the power spectra of seismic waves having apparent velocities $V_1$ and $V_2$. These lines also represent extreme ranges of the velocity passband, whereby seismic waves having an apparent velocity and corresponding power spectra located in $f,K$ space within the passband are desired seismic waves such as seismic waves having an apparent velocity $V_s$. Seismic waves having an apparent velocity such as $V_n$ and corresponding power spectra located in $f,K$ space outside the passband are undesired seismic waves. The lines $V_1$ and $V_2$ are the slopes of the power spectra of seismic waves propagating in the direction of the array since $V=\Delta f/\Delta K$. Trace representations of desired waves are to be preserved and trace representations of undesired waves are to be attenuated. It can be seen that waves having apparent velocities $V_s$ and $V_n$ have overlapping frequency and wavenumber spectra and therefore cannot be separated on either of these criteria. However, waves having apparent velocities $V_s$ and $V_n$ may be separated by dividing the frequency versus wavenumber space into velocity pass and reject bands, as shown in FIGURE 1, the passband lying within the angle $V_1OV_2$. The processing according to the invention, therefore, contemplates dividing the $f,K$ space into velocity reject and passbands. The center velocity for the desired velocity passband may be selected prior to the selection of the velocity range cutoff velocities by time shifting signals in the respective traces so the originating waves having an apparent velocity $V_c$ appear to have an infinite velocity across the detector array. This is illustrated in FIGURE 2 since the angle $V_1OV_2$ (FIGURE 1) is rotated in FIGURE 2, whereby the center velocity $V_c$ coincides with the $f$-axis resulting in the angle $-V_{co}OV_{co}$ (FIGURE 2). Velocities within the angle defined by the angle $-V_{co}OV_c$ and $V_cOV_{co}$ are designated negative and positive, respectively, for convenience. Therefore, after time shifting, signals from waves having velocity $V_c$ have zero ms. of dip per trace across the record, and the velocity passband is $V_c \pm V_{co}$.

To accomplish the objective of dividing the $f,K$ space into velocity pass and reject bands, the overall processor response must be jointly responsive to frequency and wavenumber of the seismic wave. Specifically, the overall processor response must have a wavenumber K response passband that increases with frequency $f$. With a sufficient number of detectors J, the overall processor response $R(f,K)$ approaches $$+ | for\ -|f/V_{co}| \leq K \leq |f/V_{co}|$$
and
$$O\ for\ -|f/V_{co}| \geq K \geq |f/V_{co}| \quad (1)$$

Or, referring to FIGURE 2, the overall processor response $R(f,K)$ approaches $+1$ within the velocity range defined by the angle $-V_{co}OV_{co}$ and zero outside it.

The response function to be applied to the $n^{th}$ trace sampled at location $x_n$ at each frequency $f$ over the frequency range of interest is $$R(f,x_n)=\int_{-\left|\frac{f}{V_{co}}\right|}^{\left|\frac{f}{V_{co}}\right|} e^{i2\pi Kx_n}dK = \frac{\sin 2\pi\left|\frac{f}{V_{co}}\right|x_n}{\pi x_n} \quad (2)$$

$$n=1,2,\ldots N \quad N=\text{Total number}$$

This response function, except for phase distortion, may be achieved by a two-point time domain operator $r'(t,x_n)$. If $s(t,x_n)$ is the trace sampled at location $x_n$ as a function of time $t$ and it is convolved with the response function $r'(t,x_n)$, then $$g(t,x_n)=s(t,x_n)*r'(t,x_n)$$
$$=A[s(t-\tau,x_n)-s(t+\tau,x_n)] \quad (3)$$

The frequency domain transform of $g(t,x_n)$ is $$G(f,x_n)=As(f,x_n)[e^{-i2\pi f\tau}-e^{i2\pi f\tau}] \quad (4)$$
and
$$R'(f,x_n)=(G(f,x_n)/s(f,x_n))=2Ai\sin 2\pi f\tau$$

letting $A=1/2x_n$ and $\tau=x_n/V_{co}$ where $x_n=$the distance of detector $n$ from the center of the array, then $$R'(f,x_n)= i\frac{\sin 2\pi\left|\frac{f}{V_{co}}\right|x_n}{\pi x_n}, i=\sqrt{-1} \quad (5)$$

Equation (5) states that the frequency domain transform $R'(f,x_n)$ of the two-point time domain operator $r'(t,x_n)$ is the same as the response function $R(f,x_n)$, Equation (2), except for the operator $i$. The operator $i$ introduces phase distortion of $+90°$ corresponding to $+i$ for $+f$ and $-90°$ corresponding to $-i$ for $-f$. A technique for correcting phase distortion will be discussed later. Processing each trace at every $x_n$ with an appropriate two-point time domain operator $r'(t,x_n)$, shown by Equations (3) and (5), then summing, produces the required power response since $$|R'(f,x)|^2 = |R(f,x)|^2 \quad (6)$$

The output composite from the two-point time domain operators for all J seismometers is $$Ci(t) = \sum_{\text{all } J} = S(t, x_J) * \gamma'(t, x_J) \quad (7)$$

$Ci(t)$ has the desired power response but has the phase distortion introduced by $r'(t,x_n)$.

Considering sampled seismic wave phenomena of 2P traces obtained from linearly equispaced detectors along $x$, where the traces are continuous time functions, then the output composite is $$C_1, (Pd+\tfrac{1}{2}d), (t) = \sum_{m=1-P}^{P} \frac{1}{2m-1} \left[ S_m\left(t + \frac{2m-1}{2}\tau_{co}\right) - S_m\left(t - \frac{2m-1}{2}\tau_{co}\right) \right] \quad (8)$$

$C_1, (Pd+\tfrac{1}{2}d), (t)$ is the effective signal, seen by a detector positioned along $x$ at $(Pd+\tfrac{1}{2}d)$, within the velocity passband $\pm V_{co}$.
$d$ = spacing between detectors
$m = 1-P, 2-P, \ldots 2P-P$ (dummy trace index)
$P = \tfrac{1}{2}$ total number of traces
$(Pd+\tfrac{1}{2}d)$ = spatial position in center of equispaced linear 2P detector array having a spacing $d$ between detectors.

When a center velocity $V_c$ for the passband $\pm V_{co}$ is added, Equation (8) becomes $$C_1, (Pd+\tfrac{1}{2}d), (t) =$$
$$\sum_{m=1-P}^{P} \frac{1}{2m-1} \left[ S_m\left(t + \frac{2m-1}{2}\{\tau + \tau_{co}\}\right) - S_m\left(t + \frac{2m-1}{2}\{\tau_c - \tau_{co}\}\right) \right] \tau_c = d/V_c \quad (9)$$

If the traces to be processed are digital time samples instead of continuous (analog) time functions, Equations (8) and (9) still apply. However, the traces become $S(n\tau,x)$ instead of $S(t,x)$ and $n\tau$ is substituted for $t$ in Equations (8) and (9).

$\tau$ = the time interval between digital samples and
$n$ = the number of digital samples.

Equation (9) states that each trace $S(t,x_n)$ should be weighted by $1/2-1$ and time shifted $2m-1/2\tau_c$ seconds. The time shifted trace should be separated into two channels, the trace in the first channel should be time shifted $(2m-1/2)\tau_{co}$ seconds one way, for example, backward and the trace in the second channel should be time shifted $(2m-1/2)\tau_{co}$ seconds the other way, for example, backward and the trace in the second channel should be time shifted $(2m-1/2)\tau_{co}$ seconds the other way, for example, forward. The output trace from the second channel should be polarity reversed and then summed with the output trace from the first channel. The above process should be applied to all 2P traces and the resulting 2P output traces composited (summed).

Processing the sampled traces and compositing according to Equation (9) results in an overall processing response having velocity passband $V_c \pm V_{co}$ and a reject band outside said passband.

It should be pointed out that the application of time shifts to each trace for selecting the center velocity $V_c$ may be applied to each trace prior to the forward and backward time shifts as previously described or they may be added to the forward and backward time shifts representing the selection of $\pm V_{co}$. For example, each trace from location $x_n$ may be separated into two channels, the trace in one channel would be time shifted $2m-1/2[\tau_c+\tau_{co}]$ seconds, and the trace in the other channel would be time shifted $(2m-1/2)[\tau_c-\tau_{co}]$ seconds.

Thus, each trace is time shifted as a function of its spatial origin $x$ in the detector array and as a function of the desired center velocity $V_c$ in order to select the center of the processor velocity passband (hereinafter referred to as tilting). Each trace is then operated on by a two-point time domain operator and time shifted as a function of its spatial origin $x$ and as a function of the desired cutoff velocities $\pm V_{co}$ in order to select the passband limits of the processor velocity passband (hereinafter referred to as slicing).

Examples of the application of Equation (9) to sampled traces are given.

The objective may be, for example, to scan a twelve-trace seismic field record for $\pm$ dips in the intervals from $-7$ to $+7$ ms. of dip per trace. This may be accomplished by looking at the record in seven intervals, each interval having a range of $\pm 1$ ms./trace. Each look comprises one of the ranges; $-7$ to $-5$, $-5$ to $-3$, $-3$ to $-1$, $-1$ to $+1$, $+1$ to $+3$, $+3$ to $+5$ and $+5$ to $+7$ ms./trace, respectively. The center of each range is $-6$, $-4$, $-2$, $0$, $+2$, $+4$ and $+6$ ms./trace. Taking the range $$\tau_c \pm \tau_{co} = 4 \pm 1 \text{ ms./trace}$$

and numbering the traces from top to bottom of the record $+6$, $+5$, $+4$, $+3$, $+2$, $+1$, $0$, $-1$, $-2$, $-3$, $-4$ and $-5$, Equation (9) becomes $$C_1, 6\tfrac{1}{2}d, (t) = \sum_{m=-5}^{6} \frac{1}{2m-1} \left[ S_m\left(t + \frac{2m-1}{2}\{4+1\}\right) - S_m\left(t + \frac{2m-1}{2}\{4-1\}\right) \right] \quad (10)$$

Treating the terms of the above equation separately, the process is simply one of weighting the traces by $\tfrac{1}{2}m-1$, time shifting (tilting) the traces $2m-\tfrac{1}{2} \times 4$ ms., progressively time shifting the tilted traces one way $2m-\tfrac{1}{2} \times 1$ ms., summing, progressively time shifting the tilted traces the other way $2m-\tfrac{1}{2} \times -1$ ms., summing, then obtaining the difference between the two sums.

The output $C_1, 6\tfrac{1}{2}d, (t)$ is then a trace having a waveform which represents only seismic waves having an apparent velocity in the direction of the array such that the resulting signals dip across the traces within the dip passband of $+3$ to $+5$ ms. of dip/trace, which trace is effectively seen by a detector located in the center of the array, or for the twelve-trace example at position $6\tfrac{1}{2}d$.

The schedule of weights and time shifts for the above example is given in Table I.

Taking the progression of traces from trace $-5$ to trace $+6$, the tilt and slice time shifts in Table I are applied to the traces as follows:

The tilt column describes the relative shifts to be applied to the traces with respect to an arbitrary reference. For example, if the reference is 50 ms., the traces are respectively time delayed 28 ms., 32 ms., . . . 72 ms.

The slice columns, record A and record B, also describe the relative shifts to be applied to the traces with respect to an arbitrary reference. With reference to record A, the traces are progressively shifted backward with respect to each other and with reference to record B, the traces are progressively shifted forward with respect to each other.

Thus, the traces are weighted and tilted by time shifting the traces from $-22$ ms. to $+22$ ms. The tilted traces are separated into two channels, A and B. The traces in channel A are progressively shifted in a backward direction and summed. The traces in channel B are progressively shifted in a forward direction, multiplied by −1 (polarity reversed) and summed. Then the two sums are added resulting in the $\Sigma A - \Sigma B$.

TABLE I

| Trace | Weight | Tilt | Slice | |
|---|---|---|---|---|
| | | | 2m−½×1 | 2m−½×−1 |
| m | ½m−1 | 2m−½×4 | Record A | Record B |
| +6 | +1/11 | +22 | +5½ | −5½ |
| +5 | +1/9 | +18 | +4½ | −4½ |
| +4 | +1/7 | +14 | +3½ | −3½ |
| +3 | +1/5 | +10 | +2½ | −2½ |
| +2 | +1/3 | +6 | +1½ | −1½ |
| +1 | +1 | +2 | +½ | −½ |
| 0 | −1 | −2 | −½ | +½ |
| −1 | −1/3 | −6 | −1½ | +1½ |
| −2 | −1/5 | −10 | −2½ | +2½ |
| −3 | −1/7 | −14 | −3½ | +3½ |
| −4 | −1/9 | −18 | −4½ | +4½ |
| −5 | −1/11 | −22 | −5½ | +5½ |

KEY.—

Tilt and Slice Columns:
 + represents a lag time shift (backward).
 − represents a lead time shift (forward).
Weight Column:
 + weights represent a scale value.
 − weights represent a scale value and a polarity reversal.

For the example given, signals having dips less than 3 ms. of dip/trace and more than 5 ms. of dip/trace are attenuated and signals having dips in the range 3–5 ms. of dip/trace are preserved.

To scan the field record in the interval ±7 ms. of dip/trace for the given twelve-trace example, the tilt delays, column 3, Table I, are set for six more center velocities, that is −6, −4, etc. The two-point operator slicing the cutoff range, columns 4 and 5, Table I remains the same for the given cutoff ±1 ms. of dip/trace. Thus the process is repeated six more times each with different tilt delays to accomplish the given objective.

If the equipment used to carry out the process is such that only 1 ms. delays are available for the slice delays, the time shifts given by columns 4 and 5, Table I may be rounded off in the same direction (+). The time shifts given in column 4 then run from +6 to −5 and the time shifts given in column 5 run from −5 to +6, and the output composite is $$C_1, 6\tfrac{1}{2}d, (t+\tfrac{1}{2}) = \Sigma A - \Sigma B$$

which corresponds to the response of a detector positioned in the center of the array, 6½d, and shifted ½ ms. back with respect to it.

It should be pointed out that the Equation (9) describes the weights and time shifts to be applied to the traces and thereby results in a velocity passband $V_c \pm V_{co}$. However, Equation (9) may be modified so that $V_c \pm V_{co}$ is the reject band and velocities outside said band are passed. To produce this result, Equation (9) becomes $$C_1, (Pd+\tfrac{1}{2}d), (t) = \sum_{m=1-P}^{P} \frac{1}{2m-1}\left[ S_m\left(t+\frac{2m-1}{2}\{\tau_c+\tau_{co}\}\right) + S_m\left(t+\frac{2m-1}{2}\{\tau_c+\tau_{co}\}\right)\right]$$

Therefore, instead of obtaining the difference between the sum of the traces in record A and the sum of the traces in record B ($\Sigma A - \Sigma B$), the sum of the traces in record A and the sum of the traces in record B are added ($\Sigma A + \Sigma B$).

Having the velocity range $V_c \pm V_{co}$ as a reject band has utility when the apparent velocity of the undesired wave is approximately known. The processing parameters may then be set to attenuate trace representations of all seismic waves having an apparent velocity inside the velocity range $V_c \pm V_{co}$ and preserve trace representations of all seismic waves having an apparent velocity outside said range.

Figure 3:
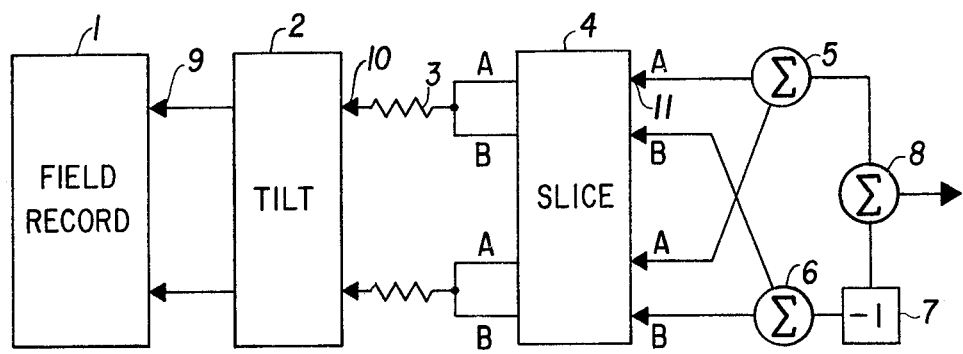
FIGURES 3 through 6 illustrate functional block diagrams of embodiments of the invention.

FIGURE 3 shows a system for carrying out the invention. The field record 1 may be a magnetic tape storing twenty-four traces of raw seismic data obtained from a linear equispaced seismometer array. Reproducing heads 9 read out the traces on 1 and apply them to tilt 2 for centering velocity $V_c$. Tilt 2 may be a magnetic drum on which the traces from 1 are recorded, operated on by delay lines and read out by reproducer 10 with the appropriate time delays $x/V_c$ and polarities for the weights $1/x$ which are applied to the tilted traces by attenuators 3. Each weighted tilted trace is then applied by separate channels A and B to the two-point operator or slice 4. Slice 4 is a magnetic drum which operates on the traces in channels A and B with time delays $+x/V_{co}$ and $-V_{co}$, respectively. The traces from channels A and B are read out of the drum 4 by reproducer 11 and fed respectively to summation networks 5 and 6. The output of 6 is fed to multiplier 7 and then to summation network 8 to be summed with the output of 5. For twelve-trace processing, reproducers 9 may be set to select traces 1 to 12 on record 1. Then the output of 8 represents seismic waves having apparent velocities within the velocity passband seen at position 6½d and may be rerecorded as a corrected trace on a magnetic tape. The position of reproducers 9 may then be changed to select traces 3 to 14 from record 1. The output of 8 in this case represents seismic waves having apparent velocities within the passband seen at position 8½d. The process is continued by selecting the various traces on record 1 to result in an output 8 which is recorded and represents traces made up of signals from seismic waves having apparent velocities within the passband seen at positions 6½d, 8½d, 10½d, 12½d, 14½d, 16½d, and 18½d.

Figure 4:
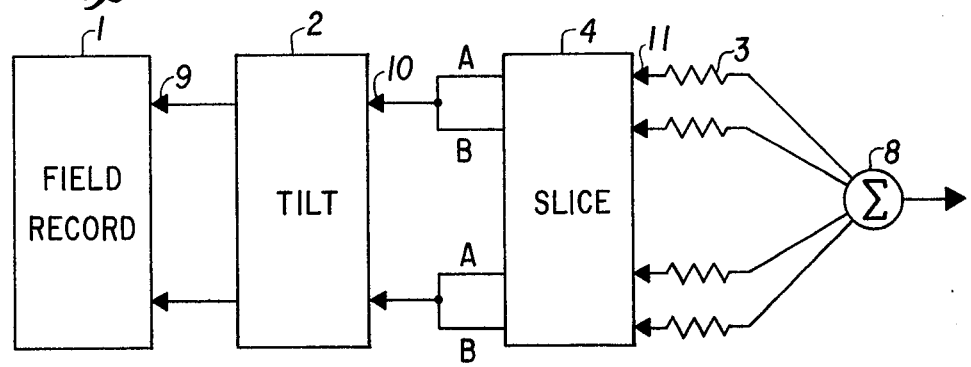

FIGURE 4 shows another system for applying the process described by Equation (9). The traces to be processed are selected from record 1 by reproducer 9 and fed to tilt 2 which performs the same function as tile 2 in FIGURE 3 that is, centers $V_c$. Slice 4 shifts the traces in channel A backward $+x/V_{co}$ and traces in channel B forward $-x/V_{co}$ and applies a polarity reversal to traces in channel B and a polarity reversal for the negative weights. If twelve traces are to be processed, then there are twenty-four traces at the output of 4. Weights $1/x$ are applied to the twenty-four traces and they are then summed to produce a composite output at 8. The polarity reversal applied by slice 4 to the traces in channel B (each trace multiplied by −1) produces an output 8 which is $\Sigma A - \Sigma B$.

Figure 5:
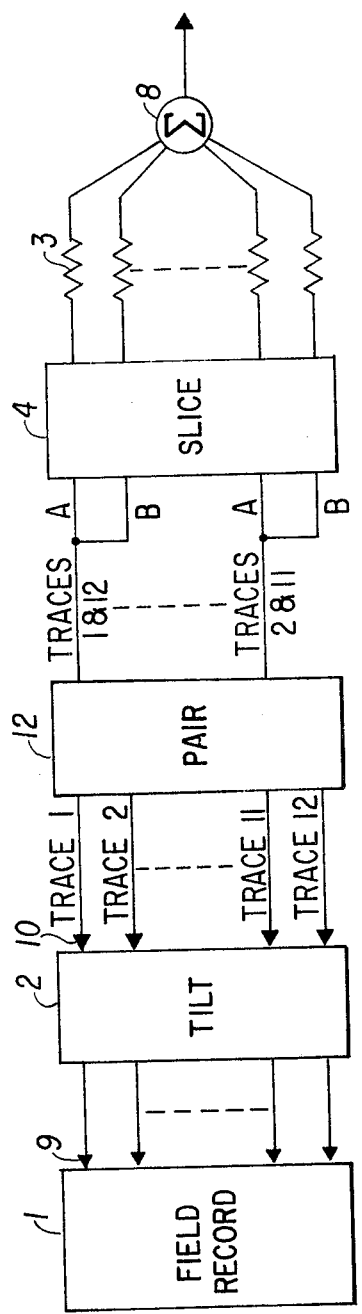

FIGURE 5 shows a system similar to FIGURES 3 and 4 except that traces having like weights and time shifts applied thereto are paired to reduce the number of delay lines in the slice 4. Assuming twelve-trace processing, traces 1 and 12 are paired, 2 and 11, 3 and 10, etc. This is possible becouse the basic process requires symmetrical weights and slice delays. For example, referring to Table I, trace +6 and trace −5 have identical weights and time shifts applied thereto except for sign. If traces +6 and −5 are paired and then separated into two channels, the time shift +5½ is applied to the traces in one channel and the time shift −5½ is applied to the traces in the other channel. The absolute value of the weight 1/11 is then applied to the traces in both channels and the polarity of the traces in the other channel is reversed. Generally, each pair of traces is separated into two channels, and the traces in one channel are progressively time shifted from +5½ to +½, see record A, Table I. The traces in the other channel are progressively time shifted from −5½ to −½ and polarity reversed. See record B, Table I. The absolute value of the weight corresponding to the paired traces is then applied and all the traces are summed. Pairing the traces and processing as described above results in the same schedule of weights and time shifts as given in Table I.

Thus, a twelve-trace output from tilt 2 can be paired to provide six channels at the output of pair network 12. Each channel at the output 12 is separated to form channels A and B. This requires that slice 4 have twelve delay lines as contrasted to twenty-four in the systems illustrated by FIGURES 3 and 4. The traces in channel A are operated on by delay $+x/V_{co}$ in slice 4 and the traces in channel B are operated on by delay $-x/V_{co}$ and polarity reversed. Attenuators 3 apply the weights $1/x$ to the twelve-channel output from 4 which is then summed by network 8.

Figure 6:
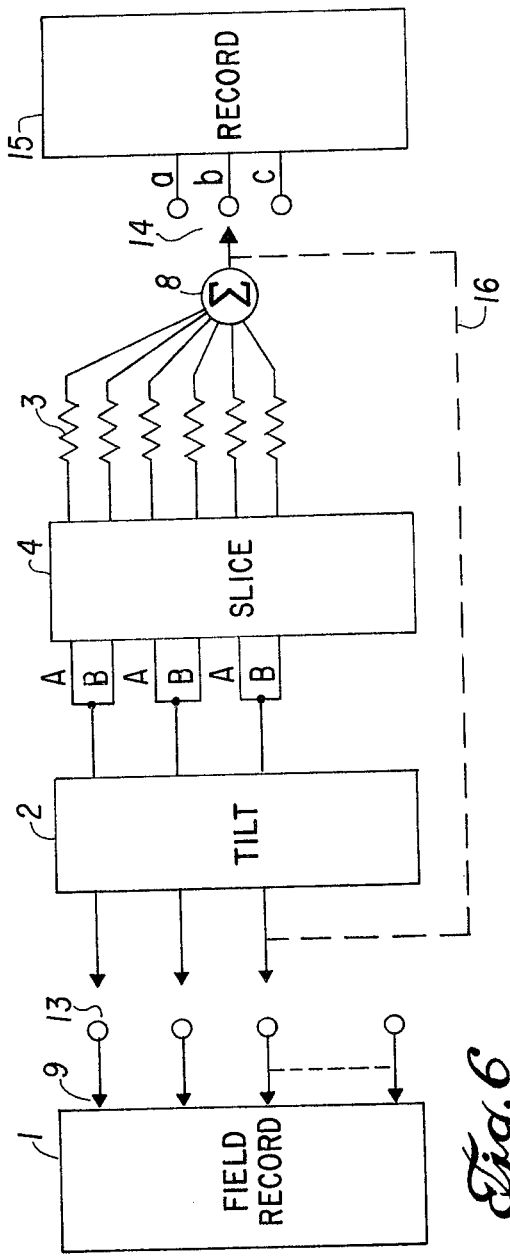

FIGURE 6 shows sequencers 13 and 14 linked by 16 in the FIGURE 4 embodiment. Sequencer 13 selects any polarity (2P) traces from field record 1 to be processed. Sequencer 14 is synchronized to this selection by link 16 to select an output channel $(a)$ for recording a corrected trace on magnetic recorder 15. A second selection of 2P traces to be processed results in a second selected output channel $(b)$, etc. Input and output sequencers such as 13 and 14 may be provided with the field record 1 output and sum output 8, respectively, for any of the embodiments of FIGURES 3 through 5.

Figure 7:
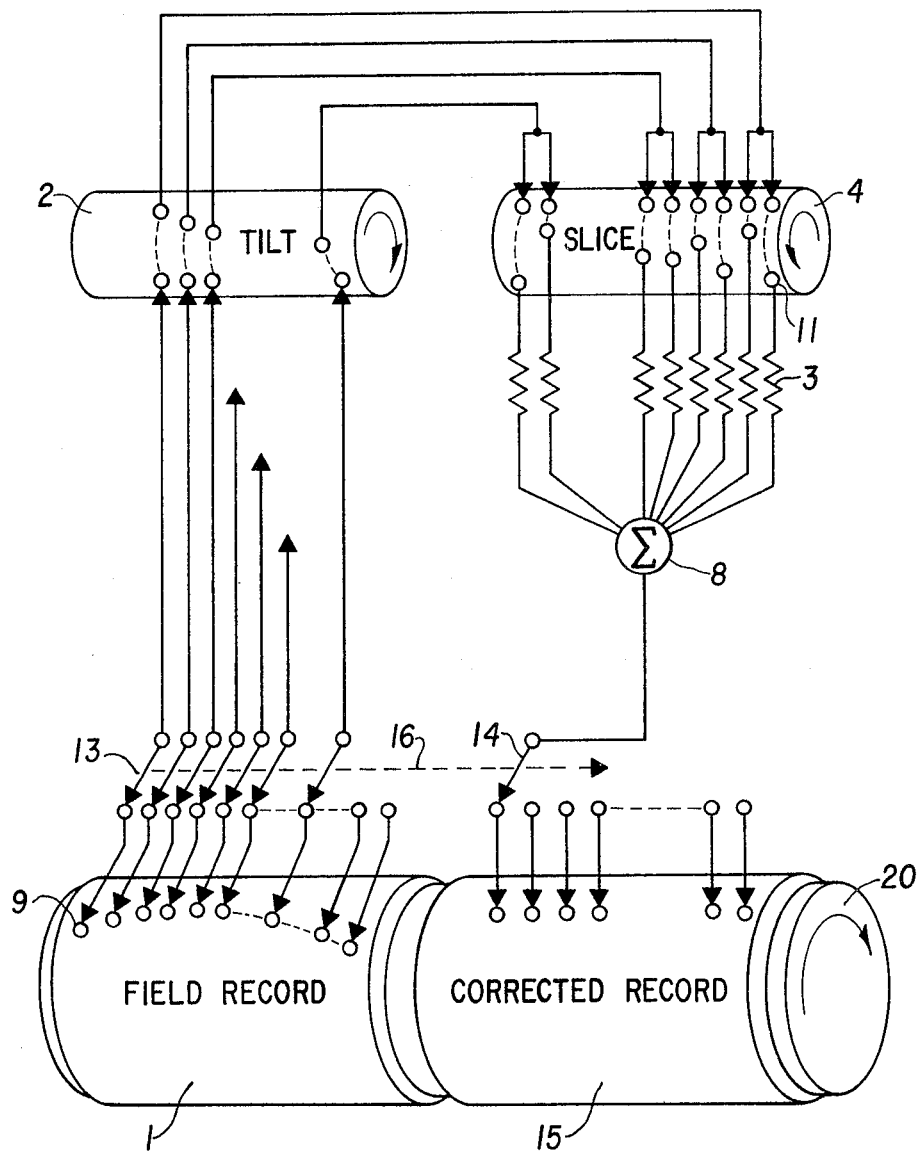
FIGURE 7 illustrates the major components of the embodiment of FIGURE 4.

FIGURE 7 shows a functional diagram of the invention illustrating the major components 1, 2, 3, 4 and 15 generally shown in FIGURE 4. Assuming a twelve-trace input from field record 1, data is applied to twenty-four tracks in slice delay drum 4. The tilt delay drum 2 and slice delay drum 4 are illustrated as separate components for functional clarity. However, said components are physically one component, a twenty-four track magnetic drum with record and reproduce heads. Each tilt delay is added to the slice delay.

The tape transport 20 includes a field record tape 1 and a corrected record tape 15 on a common drum. The tape transport 20 may be a Techno Recorder-Reproducer TI 401C manufactured by Techno-Instrument Corporation and equipped with an Automatic Time Corrector TI-580B for adjusting the movable reproduce heads 9 to time-correct the reproduced traces for weathering, elevation and normal moveout. The field record 1 may have recorded thereon raw seismic data produced from a twenty-four seismometer equispaced linear array, the field record thereby having twenty-four tracks. The input and output sequencer switches 13 and 14 respectively and link 16 may select twelve tracks from record 1 and one track in record 15, whereby twelve traces are applied to the processor input producing a one trace corrected output as explained in connection with FIGURE 6. After each revolution of the common drum in tape transport 20, the sequencer 13 selects another twelve trace grouping and sequencer 14 selects another track in record 15. By sequentially scanning the twenty-four traces stored on record 1, a corrected recording is built up on record 15.

Tilt 2 and slice 4 may be a magnetic drum having twenty-four tracks with each track having an adjustable delay, for example, from 10 to 110 ms. The delays to be applied to each channel are given by Equation (9), that is each trace read out of the field record 1 is written into two tracks filling the twenty-four channels of the magnetic drum, the reproduce heads 11 for said drum are spatially distributed, whereby the trace in the first of said two tracks when read out is time shifted $(2m-1/2)\{\tau_c+\tau_{co}\}$ ms. The polarity reversal of the traces read out from said second of said two tracks is accomplished by reversing the leads of the slice 4 output. The weights $1/2m-1$ applied to each of the twenty-four traces read out of the drum are applied by attenuators 3.

The pairing technique explained in connection with FIGURE 5 may be applied to the twenty-four track drum as follows: The twelve input traces read out from record 1 are written into twelve tracks in one section of said drum. Tilt delays are applied to the traces read out from said one section of said drum by the spatial distribution of the reproduce heads. The traces are then paired and written into the remaining twelve tracks in another section of said drum. The traces are read out of said another section of said drum with the appropriate slice delays and polarities, then weighted and summed.

Figure 8:
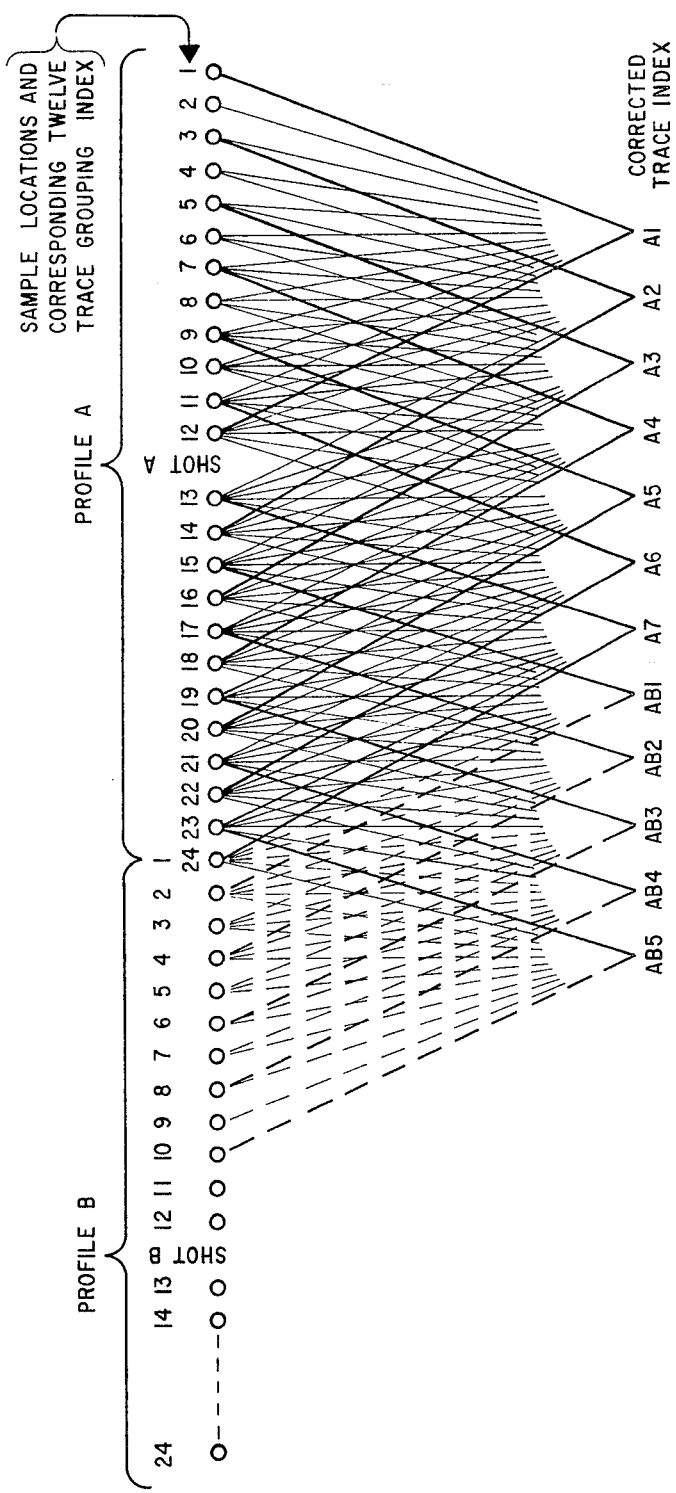
FIGURE 8 illustrates twelve-trace groupings of seismic data from shots A and B.

Sometimes, it may be necessary to process data stored on more than one tape for example, when it is desired to process forty-eight traces stored on two tapes, each tape having twenty-four tracks, and the tape transport drum is only capable of holding one tape at a time. Therefore, assuming forty-eight traces of seismic data stored on two tapes, each having twenty-four tracks, FIGURE 8 illustrates the locations from which the traces are sampled and a twelve-trace grouping index for processing, whereby corrected traces A–1 through A–7 and AB–1 through AB–5 as seen by effective detectors at locations A–1 through A–7 and AB–1 through AB–5 are built up on the final recording tape. FIGURE 8 further illustrates the twenty-four traces stored on twenty-four tracks of a first tape hereinafter referred to as profile A and which traces represent energy received from shot A by seismometers located at locations 1 through 24, profile A. Twenty-four traces are also stored on another tape hereinafter referred to as profile B which traces represent energy received from shot B by seismometers located at locations 1 through 24, profile B in FIGURE 8.

It can be seen in FIGURE 8 that traces 15 through 24, profile A, and traces 1 through 10, profile B, contain partial data necessary to produce corrected traces AB–1 through AB–5. The following describes a procedure and system, whereby the partial data on profiles A and B are processed to produce a recording on the dual section 26 of the corrected record illustrated in FIGURE 9.

Profile A is loaded onto tape transport 20, illustrated in FIGURE 7, with profile A corresponding to field record 1. Referring now to FIGURE 9, the automatic time corrector 21 is illustrated to show the output from the field record and said corrector applies the twenty-four traces stored by record 1 to sequencer 13 which performs the function of scaning the record to apply the selected twelve-trace group to the processing system. Assuming switch 30 in its left position so that the output of the weigh and sum circuit 23 is connected to sequencer 14, sequencer 13 scans the record and applies traces 1 through 12, 3 through 14, 5 through 16, 7 through 18, 9 through 20, 11 through 22, and 13 through 24 sequentially to the processor, whereby corrected traces A–1 through A–7 are built up on the fixed section 25 of the corrected record. Sequencer 14 selects a different track on the fixed section 25 with which twelve-trace selection of sequencer 13.

The corrected record 15, illustrated in FIGURE 7, is shown in FIGURE 9 as divided into two sections, fixed section 25 and dual section 26. The dual section 26 has five tracks, each track having a dual fixed head, whereby data is written into the record on one half-width of a track and then on the other half-width of the same track by selection of one or the other of the dual heads. The data is read out of section 26 by a full-width, reproduce head for each track. Said reproduce head has a width equal to the full-width of the track and therefore, reads out the summation of data recorded on each half-width of the single track.

Since the partial data on profile A and profile B necessary for producing corrected traces AB–1 through AB–5 are not available at the same time, the partial outputs from profile A are recorded on one half-width tracks in section 26 and then the partial outputs from profile B are recorded on the other half-width tracks in section 26, the result being a corrected trace from each track when read out of section 26. This is accomplished as follows:

Traces 15 through 24, profile A, are selected by sequencer 13 and processed, whereby sequencer 14 selects one of the dual fixed heads for the first track in section 26 and the output is recorded therein. Traces 17 through 24 are then selected by sequencer 13 and sequencer 14 selects one dual head for the second track in section 26 for recording. Traces 19 through 24 are selected by sequencer 13 and processed, whereby sequencer 14 selects one dual head of the third track in section 26 for recording. The process is continued until the partials AB–1 through AB–5 from the data stored on profile A are recorded on five half-width tracks in section 26. Profile B is now loaded on the tape transport. Profile B contains twenty-four traces, as illustrated in FIGURE 8, with traces 1 through 10 containing the partial data for corrected traces AB–1 through AB–5. In processing the data on profile B, the sequencer 13 selects traces 1 and 2, whereby the processor output is recorded on the other half-width of the first track in section 26 by the selection of sequencer 14. Traces 1 through 4 are then selected by sequencer 13 and processed, and the output of the processor is recorded on the other half-width of the second track in section 26 by the section of sequencer 14. The traces on profile B, having the partial data, are selected by sequencer 13 until all the partial data is stored on the other half-width of the five tracks in section 26.

It can be seen then, that profile A contains traces 15 through 24 having partial data and profile B contains traces 1 through 10 having partial data, the partial data being combined on half-width tracks using a dual fixed head in a recorder so that a corrected trace is produced when the full width of each track is read out.

Generally, when recording the partial data on one half-width of a track in section 26 from the partial data on profile A and then recording partial data from profile B on the other half-width of said one track, these partial recordings must be phase aligned so that when played back they are properly summed. Phase alignment of the dual recording is accomplished by the monitor 29 which compares the time breaks 27 and 28 on the corrected record and the original field tape respectively. The time break of the shots A and B is recorded on the original field tape of profile A and profile B as is conventional in the art. Initially, the time break on profile A is directly recorded on the corrected record. The time break from profile B is then compared by the monitor with the time break recorded on the corrected record from profile A. If the monitor indicates that the phase is improper, the movable heads of the automatic time corrector 21 may be adjusted so that the phase of the trace to be recorded by the second one of the dual heads is properly phased with the trace that was recorded with the first one of the dual heads.

Switch 31 is a tilt-bypass and may be used when the desired center velocity for the passband is zero. Switch 30 optionally connects the multiple analyzer eliminator (M.A.E.) 24 into the system. Consider switch 30 in its left position for the present since the function of component 24 will be discussed later.

FIGURES 10A, 10B, 10C and 10D combined in the following manner, illustrate the signal paths of the system of FIGURE 9.

Figure 10A:
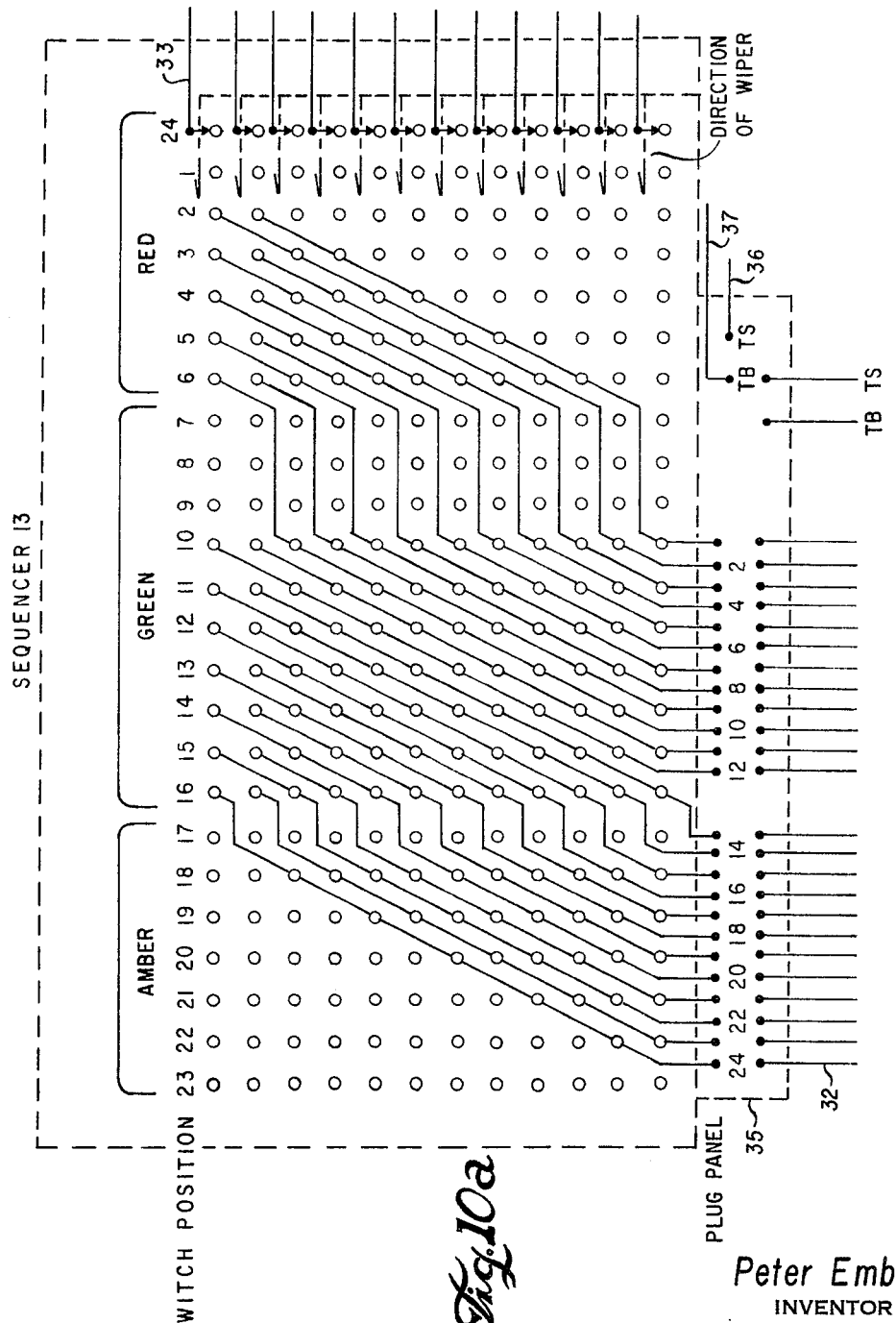

The output channels 33 of sequencer 13 in FIGURE 10A are connected respectively to the input channels 33 of the reproduce amplifiers 22 in FIGURE 10B. The output channels 34 of the slice 4 in FIGURE 10B are connected to a respective input channel 34 of the weigh and sum circuit 23 of FIGURE 10C. Terminals TB and TS on the plug panel 35 in FIGURE 10A are connected respectively to leads 36 and 37 of FIGURE 10D. Leads 38, 39 and 40 of FIGURE 10D are respectively connected to leads 38, 39 and 40 of FIGURE 10C.

Referring to FIGURE 10A, channels 32 correspond to the twenty-four channel output of the automatic time corrector 21 of FIGURE 9. The traces read out of the field record 1 are applied to plug panel 35 by a respective channel 32. Each channel 32 has a respective output from plug panel 35 which is connected to the sequencer 13 in a predetermined pattern. The plug panel 35 is inserted between the channels 32 and the sequencer 13 for the purpose of normalizing the field data to the specifications required in the process for example, normalizing variation in group interval, bad traces, reverse traces, and reverse cable layouts can be compensated in the plug panel. The sequencer 13 is illustrated in three sections, red, green and amber. The red section of the sequencer is for the purpose of processing the partial data stored on profile B producing corrected traces AB–1 through AB–5. The green section of the sequencer is for processing the data stored on profile A for producing corrected traces A–1 through A–7 and the amber section of the sequencer is for processing the partial data on profile A for producing corrected traces AB–1 through AB–5. The terminals 1 through 24 on plug panel 35, illustrated by even numbers 2 to 24, correspond to the numbers given to the sample locations for profiles A and B in FIGURE 8, for example the trace sampled at location 1, profile B, in FIGURE 8, is applied through one of the channels 32 to the terminal 1.

Figure 10C:
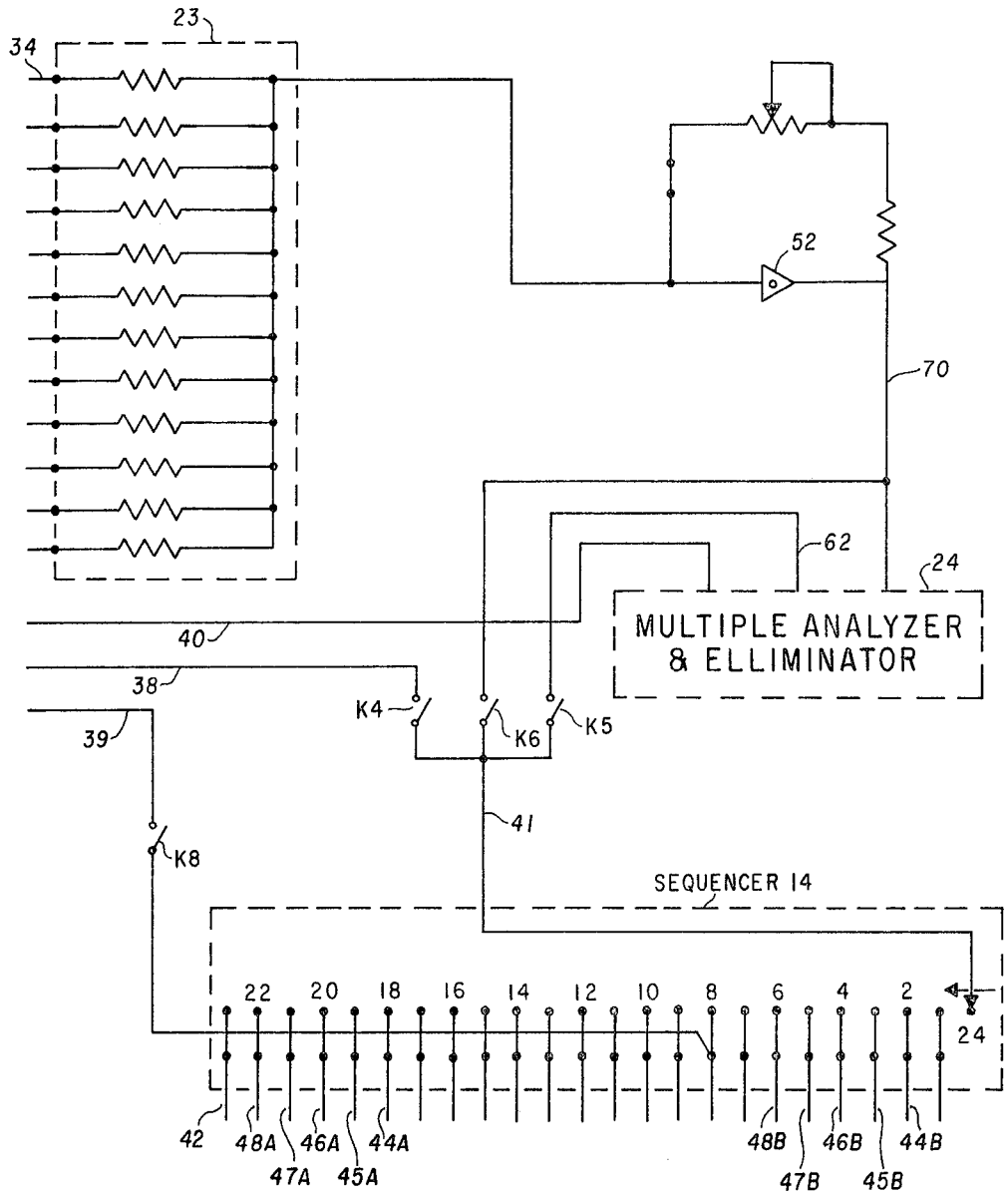

Referring to FIGURE 10C, the sequencer 14 is illustrated having twenty-four switch positions, each corresponding to one of the twenty-four switch positions of the sequencer 13. The sequencers 13 and 14 are illustrated in switch position 24. Sequencer 14 connects the output channel 41 to one of the channels 42, the channels 42 being connected to the record heads of the corrected record illustrated in FIGURE 9. There are five tracks having dual recording heads in dual section 26 and leads 44A and 44B connect a respective one of the channels 42 to a respective one of the dual heads of one track in section 26. Similarly leads 45A and 45B connect a respective one of the channels 42 to a respective one of the dual heads of another track in dual section 26, etc. A Table II, given below, lists the sequencer 13 and 14 switch positions and the function including the traces to be connected for processing in each switch position. The sequencer switch positions move from position 7 through 23 and then from 24, 1 through 6, thereby scanning profile A and profile B. There are twenty-four switch positions for the sequencer 13 indicated from right to left as 24, 1, 2 . . . 23 and there are twenty-four corresponding switch positions for the sequencer 14. Separating each sequencer switch section are ready positions where the system is inactive except on command from the operator, and these positions may be used for setting parameters before processing. The sequencers 13 and 14 may be a group of motorized rotary switches to accomplish their functions.

TABLE II

| Switch Position | Function |
| --- | --- |
| 24 | Ready. |
| 1 | Transcribe Field Time Break TB From Profile B. |
| 2 | Traces 1 Through 2, Profile B. |
| 3 | Traces 1 Through 4, Profile B. |
| 4 | Traces 1 Through 6, Profile B. |
| 5 | Traces 1 Through 8, Profile B. |
| 6 | Traces 1 Through 10, Profile B. |
| 7 | Ready. |
| 8 | Transcribe Field Time Break TB From Profile A. |
| 9 | Transcribe Timing Signal TS From Profile A. |
| 10 | Traces 1 Through 12, Profile A. |
| 11 | Traces 3 To 14, Profile A. |
| 12 | Traces 5 To 16, Profile A. |
| 13 | Traces 7 To 18, Profile A. |
| 14 | Traces 9 To 20, Profile A. |
| 15 | Traces 11 To 22, Profile A. |
| 16 | Traces 13 To 24, Profile A. |
| 17 | Ready. |
| 18 | Traces 15 To 24, Profile A. |
| 19 | Traces 17 To 24, Profile A. |
| 20 | Traces 19 To 24, Profile A. |
| 21 | Traces 21 To 24, Profile A. |
| 22 | Traces 23 To 24, Profile A. |
| 23 | Transcribe Cam Reference Pulse. |

Referring to FIGURE 10B, an output channel from the sequencer 13 is applied to a respceive reproduce amplifier 22. A reproduce amplifier is provided for each output channel of the sequencer 13 and provides the function of amplifying the voltage level of the signal and also corrects for frequency and phase distortion inherent in the read out of direct recordings such as the Techno-Recorder-Reproducer. For the given example of twelve-trace processing, twelve output channels from the reproduce amplifiers are connected to the tilt 2. The delay system referred to as tilt 2 includes twelve FM modulators 49, twelve delay line rings 50 and twelve FM demodulators 51. The delay system referred to as slice 4 includes similar components in each channel as tilt 2. The delay line rings 50 are magnetic drums and the FM modulators 49 and demodulators 51 are used to write information into the drum and read the information out of the drum as is well-known in the art. Polarity reversal is available at the output of the FM demodulators in the slice 4 to provide negative weightings.

The twelve-channel output from tilt 2 is combined to form a six-channel output by the pair network 12. The six-channel output from pair network 12 is then separated into twelve channels, whereby each channel output from the pair network is separated into two channels which are connected to the slice 4.

Referring to FIGURE 10C, the twelve-channel 34 output from the slice 4 is applied to a respective channel in the weigh and sum circuit 23 and then to amplifier 52 having a variable resistive feedback for controlling the level of the composite output signal.

The delay system of tilt 2 may be bypassed by tilt bypass 31 which includes channel 56 applying the output at each reproduce amplifier through separate conductors in channel 56 to switches 58 which would be closed and through switches 59 which would be closed and then to the pair network 12. The switches 57 are open when the tilt bypass is used. The outputs of the individual reproduce amplifiers 22 or the individual demodulators 51 may be tested with tester 60 by opening switch 59 and alternately closing switches 57 with switches 58 open or closing switches 58 with switches 57 open.

The monitor system, FIGURE 10D, includes a pen recorder 61 having pen A and pen B for separate recordings, and a reproduce amplifier 66. Also included are the switches K-1, K-2, K-3 and K-7 illustrated in FIGURE 10D, and switches K-4, K-5, K-6 and K-8, illustrated in FIGURE 10C.

Table III lists the sequencer 13 and 14 switch positions and the corresponding positions of the switches K-1 through K-6.

When the M.A.E. 24 is used, the positions of the switches K-5 and K-6, given in Table III, are interchanged.

TABLE III

| Switch Position | K-1 | K-2 | K-3 | K-4 | K-5 | K-6 | K-7 | K-8 |
|---|---|---|---|---|---|---|---|---|
| 24 | D | U | U | O | O | C | 1 | D |
| 1 | U | U | U | C | O | O |  | U |
| 2-6 | U | U | U | O | O | C |  | U |
| 7 | D | U | U | O | O | C |  | U |
| 8 | U | U | U | C | O | O |  | U |
| 9 | U | U | U | O | O | O |  | U |
| 10-16 | U | U | D | U | O | C |  | U |
| 17 | D | U | U | O | O | C |  | U |
| 18-22 | U | U | U | O | O | C |  | U |
| 23 | U | D | U | C | O | O |  | U |

KEY.—
D—Down.
U—Up.
O—Open.
C—Closed.

The switch K-7, FIGURE 10D, has an upper section and lower section each having five positions linked together. This switch is used when the sequencer is in the ready positions 24, 7 and 17. Therefore, switch K-7 may be used to apply the time break from the corrected record to pen B in position 1, apply a timing signal TS from profile A to pen B in position 2, apply a cam reference pulse to pen B in position 3, apply a M.A.E. gate to the pen B in position 4, and apply test signals to pen B in position 5. These recordings are intended for calibration purposes.

To phase align the recordings of the partial data on profiles A and B, the sequencer in switch position 8, the time break from profile A is recorded on the corrected tape. In sequencer position 24, switch K-8 down, switch K-1 down and switch K-7 in position 1, the time break from the corrected record is applied to pen B. In sequencer switch position 1, the time break from profile B is recorded on the pen recorder, pen A, for comparison with the profile A time break read out of the corrected record. This allows a phase comparison to be made between the time breaks on profile A and profile B, whereby the movable heads of the automatic time corrector may be adjusted for phase alignment.

The cam reference switch 65 is standard equipment with the Techo Automatic Time Corrector and is mechanically synchronized with the rotation of the tape transport drum for adjusting the movable heads of the automatic time corrector to dynamically correct for normal moveout. A reference pulse derived from the cam reference switch may be applied to the pen recorder, pen B, with switch K-7 in position 3.

The application of the process according to the invention has been described herein with respect to seismic traces stored on magnetic tape. This data is not real time and therefore, forward time shifts may be introduced. However, if real time data, such as the traces derived directly from the detector outputs, are to be processed, forward time shifts cannot be applied. Therefore, real time data is delayed by the largest forward time shift needed which is then used as the time reference from which the forward and backward time shifts are applied.

The invention applies to processing data obtained from sampling seismic wave phenomena such as data obtained is seismological and seismic exploration work. However, the invention also applies to processing data obtained from sampling acoustic wave phenomena such as data obtained from marine seismic exploration, whereby underwater acoustic energy from a shot is received by a hydrophone array, and data obtained in sonar applications where the direction of the acoustic wave propagation may be converted into an apparent velocity of the acoustic waves in the direction of a line array.

If the traces on a marine seismic record are to be processed, the M.A.E. 24, FIGURE 10C, may be used to eliminate water reverberations represented in the composite output trace in channel 70. The composite output trace in channel 70 is applied to the input of M.A.E. 24 and the output is taken from channel 62 (switch K-5 closed and switch K-6 open). A signal proportional to the integrating limits of the M.A.E., herein referred to as the M.A.E. gate, may be applied to the pen recorder 61, pen B, through channel 40 with switch K-7 in position 4. The component herein referred to as M.A.E. 24 is described in copending application Serial No. 782,942 entitled "Filtering Techniques and a Filter for Eliminating Multiple Reflections Occurring in the Detected Signals of Marine Sesimic Exploration" by Milo M. Backus, and which application is assigned to the assignee of the present application.

An example of the applicability of the invention for processing data obtained from sampling underwater acoustic wave phenomena will now be given.

FIGURE 11 illustrates the axis of a hydrophone array, a line normal to the axis, the direction of propagation of an acoustic wave propagating with a velocity C, and the apparent velocity V of the acoustic wave in the direction of the array axis.

The apparent velocity V is equal to $C/\sin \alpha$, where $\alpha$ is the angle between the direction of wave propagation and a normal to the array axis.

Under given conditions such as temperature and salinity, the velocity of the acoustic wave C is constant obtained from a two dimensional array inherently removes the phase distortion in the output trace since processing the row detector outputs to get y outputs introduces a ±90° phase shift in each output, and then processing the y row outputs introduces another ±90° phase shift, the net phase change in the output trace 85 is then 0° or 180°. If the net phase change is 180°, then the output trace 85 should be polarity reversed. Thus, each of the sequential processes is antisymmetrical in the time domain, so when applied sequentially, the combined response represents a symmetrical operation which changes the phase of the output trace by 0° or 180°.

FIGURE 13 illustrates the location of the power spectra of seismic waves having apparent velocities $V_{cox}$, $-V_{cox}$, $V_{coy}$, and $-V_{coy}$ in three dimensional $f,K$ space. The velocities $V_{cox}$ and $-V_{cox}$ are the cutoff velocities for the predetermined velocity range in the direction of the lines defined by the rows of FIGURE 12, which velocities are used in conjunction with Equation (9) to determine the parameters of the systems 81, 82 ... 83. The velocities $V_{coy}$ and $-V_{coy}$ are also the cutoff velocities for the predetermined velocity range in the direction of the lines defined by the columns in FIGURE 12 and are used in conjunction with Equation (9) to determine the parameters of the system 84.

Processing data from a two-dimensional array as described in conjunction with FIGURE 12 and using said cutoff velocities $V_{cox}$, $-V_{cox}$, $V_{coy}$ and $-V_{coy}$, results in an over-all processing response which approaches a rectangular pyramid in $f,K$ space. The pyramid is illustrated in FIGURE 13 with its apex at $(0,0,0)$ and its vertical axis on $(0,0,f)$. Therefore, trace representations of all seismic waves having apparent velocities such that their power spectra are inside the pyramid are preserved and representations of all seismic waves having apparent velocities such that their power spectra are outside the pyramid are attenuated. Each of the systems 81, 82, ... 83 and 84, generally illustrated in FIGURE 12, may be any of the embodiments illustrated by FIGURES 3 through 9.

As recalled, processing data from a one-dimensional array according to Equation (9) introduces phase distortion in the composite output trace caused by the two-point time domain operator which is illustrated by its frequency domain transform Equation (5). To remove the phase distortion, a filter $H(f)$ applied to the composite output trace is required, the filter having a response $-i$ for $+f$ and $+i$ for $-f$.

The impulse response $h(t)$ for said filter $H(f)$ having a desired response in the frequency band $-f_{max} < f < f_{max}$ is $$2\pi h(t) = 2\pi \int_{f_{max}}^{f_{max}} H(f)e^{i2\pi ft} df$$

$$= -2\pi \int_0^{f_{max}} e^{i2\pi ft} df + 2\pi \int_{f_{max}}^0 i e^{i2\pi ft} df$$

$$= -\frac{1}{t}[1 - e^{i2\pi f_{max} t}]$$

$$= +\frac{4}{t}[\sin^2 (2\pi f_{max} t/2)] \quad (14)$$

Equation (14) describes the theoretical time impulse response for the filter to be applied to the composite output trace. This response may be approximated by a sample point time domain operator such as a delay line having a plurality of sample points along its length with each sample point weighted and fed to a summation point.

For the response given, Equation (14), the time interval between sample points is $\Delta t = 1/f_{max}$, since even sample points have zero values.

Assuming $f_{max} = 20 KC$ then $\Delta t = 50 \times 10^{-6}$ sec.

With reference to $t=o$ midway between end sample points, and taking an even number of 2P sample points which are numbered in odd numbers from $-(P-1)$ to $(P-1)$, the weights become $1/m$ where $m = -(P-1)$, ... $+(P-1)$ in odd numbers.

Assume $P=10$, then the weights and time shifts are given by Table V.

TABLE V

| Sample Point | Weight | Time Shift, Sec. |
|---|---|---|
| −9 | −⅑ | −225 |
| −7 | −⅐ | −175 |
| . | . | . |
| −1 | −1 | −25 |
| +1 | +1 | +25 |
| +3 | +⅓ | +75 |
| . | . | . |
| +9 | +⅑ | +225 |

In summary, the invention contemplates multichannel data processing prior to compositing the data. The data in each channel is a function of a spatial origin with respect to the spatial origin of the data in each other channel since the data are obtained from sampling wave phenomena at separate locations on a line. Predetermined weights and time shifts are applied to the data in each channel as a function of the spatial origin and as a function of a predetermined relative time delay range for data in one channel with respect to data in another channel thereby providing a composite output which is indicative of the presence of data in the channels having relative time delays with respect to one another inside or outside the predetermined relative time delay range.

Although the invention has been described herein in conjunction with the apparent velocity of wave phenomena in the direction of a linear array, this should not be taken in a limiting sense. The invention may be applied to data sampled from linear separate locations, which data originated from physical disturbances having an actual velocity in the direction of the locations.

It should be understood that the invention described herein is not limited to sampling the data to be processed from linear equispaced locations but that the sampling locations may be unequally spaced, for example a linear symmetrical array having a line of detectors symmetrically positioned about a center point on the line.

It is to be understood that the above described process and the embodiments for carrying out the process are merely illustrative of the invention. Numerous other arrangements may be devised by those skilled in the art without departing from the spirit and scope of the invention as defined by the appended claims.

What is claimed is:

1. A method of processing seismic traces to indicate the presence, inside a predetermined time delay range, of signals in each trace having a time delay with respect to signals in another trace, wherein each trace is a function of its spatial origin in relation to the spatial origin of each other trace, comprising the steps of:
   (a) weighting each trace in relation to each other as a function of their respective spatial origins,
   (b) bidirectionally time shifting each trace in relation to each other as functions of their respective spatial origins and the predetermined time delay range,
   (c) and compositing all the weighted and time shifted traces to produce a composite output indicative of the presence, inside the predetermined time delay range, of signals in each trace having a time delay with respect to signals in another trace.

2. The method of claim 1, wherein the step of compositing includes reversing the polarity of selected traces and summing all the traces to produce the composite output, whereby signals in each trace having a time delay with respect to signals in another trace inside the predetermined time delay range are preserved.

3. The method of claim 1, wherein the step of compositing includes summing all the traces to produce the composite output, whereby signals in each trace having a time delay with respect to signals in another trace inside the predetermined time delay range are attenuated.

4. The method of claim 1, wherein the step of weighting includes weighting each trace in relation to each other trace as an inverse function of their respective spatial origins, and wherein the step of time shifting includes time shifting the traces progressively in relation to each other in one direction as functions of their respective spatial origins and one of the cutoff limits of the predetermined time delay range, and time shifting the traces progressively in relation to each other in the other direction as functions of their respective spatial origins and the other of the cutoff limits of the predetermined time delay range.

5. The method of claim 4, further including the step of reversing the polarity of the traces progressively time shifted in the other direction prior to compositing.

6. A method of processing seismic traces to indicate the presence, inside a predetermined time delay range, of signals in each trace having a time delay with respect to signals in another trace, wherein each trace is a function of its spatial origin in relation to the spatial origin of each other trace, comprising the steps of:
  (a) weighting each trace in relation to each other trace as an inverse function of their respective spatial origins,
  (b) separating each trace into a plurality of channels,
  (c) time shifting the traces in one channel in each of the plurality of channels progressively in relation to each other in one direction as functions of their respective spatial origins and one of the cutoff limits of the predetermined time delay range,
  (d) time shifting the traces in another channel in each of the plurality of channels progressively in relation to each other in the other direction as functions of their respective spatial origins and the other cutoff limit of the predetermined time delay range,
  (e) time shifting each trace in relation to each other trace as a function of the center of the predetermined time delay range so that any signals in the traces having a time delay corresponding to the center of the range are shifted to have zero time delay,
  (f) and compositing all the weighted and time shifted traces to produce a composite output indicative of the presence, inside the predetermined time delay range, of signals in each trace having a time delay with respect to signals in another trace.

7. A method of processing seismic traces obtained from sampling seismic wave phenomena at separate locations on a line to indicate the presence, inside a predetermined velocity range, of signals in the traces representing seismic waves having an apparent velocity in the direction of the line, wherein each trace is a function of its spatial origin which corresponds to its sample location on the line in relation to the spatial origin of each other trace, comprising the steps of:
  (a) weighting each trace in relation to each other trace as a function of their respective spatial origins,
  (b) bidirectionally time shifting each trace in relation to each other trace as functions of their respective spatial origins and the predetermined velocity range,
  (c) and compositing all of the weighted and time shifted traces to produce a composite output indicative of the presence, inside the predetermined velocity range, of signals representing seismic waves having an apparent velocity in the direction of the line.

8. The method of claim 7, including the step of separating each trace into a plurality of channels, and wherein the step of time shifting includes time shifting the traces in one channel in each of the plurality of channels progressively in relation to each other in one direction as functions of their respective spatial origins and one of the cutoff limits of the predetermined velocity range, and time shifting the traces in another channel in each of the plurality of channels progressively in relation to each other in the other direction as functions of their respective spatial origins and the other cutoff limit of the predetermined velocity range.

9. The method of claim 8, wherein the step of time shifting includes time shifting each trace in relation to each other trace as a function of the center velocity of the velocity range so that any signals in the traces representing seismic waves having an apparent velocity corresponding to the center velocity are shifted to have zero time delay between the traces.

10. A method of processing seismic traces obtained from sampling seismic wave phenomena at separate locations on a line to indicate the presence, inside a predetermined velocity range, of signals in the traces representing seismic waves having an apparent velocity in the direction of the line, wherein each trace is a function of its spatial origin with respect to the center of the sampling locations on the line, comprising the steps of:
  (a) weighting each trace in relation to each other trace symmetrically as an inverse function of their respective spatial origins with respect to the center of the sample locations,
  (b) separating each trace into a plurality of channels,
  (c) time shifting the traces in one channel in each of the plurality of channels progressively in relation to each other in one direction and symmetrically as a function of their respective spatial origins with respect to the center of the sample locations and as a function of one of the cutoff limits of the predetermined velocity range,
  (d) time shifting the traces in another channel in each of the plurality of channels progressively in relation to each other in the other direction and symmetrically as a function of their respective spatial origins with respect to the center of the sample locations and as a function of the other of the cutoff limits of the predetermined velocity range,
  (e) and compositing all of the weighted and time shifted traces to produce a composite output indicative of the presence, inside the predetermined velocity range, of signals in the traces representing seismic waves having an apparent velocity in the direction of the line.

11. A method of processing multichannel data, wherein the data in each channel is a function of its spatial origin with respect to the spatial origin of the data in each other channel, comprising the steps of:
  (a) weighting the data in each channel with respect to to the data in each other channel as a function of their respective spatial origins,
  (b) bidirectionally time shifting the data in each channel with respect to the data in each other channel as functions of their respective spatial origins and a predetermined time delay range for data in one channel with respect to data in another channel,
  (c) and compositing all of the weighted and time shifted data to produce a composite output indicative of the presence, inside the predetermined time delay range, of the data in one channel having a time delay with respect to data in another channel.

12. A method of processing multichannel data, wherein the data in each channel is a function of its spatial origin with respect to the spatial origin of the data in each other channel, comprising the steps of:
  (a) weighting the data in each channel with respect to the data in each other channel symmetrically as a function of the spatial origin of the data about a center position,
(b) separating the data in each channel into a plurality of paths,
(c) time shifting the data in one path in each of the plurality of paths progressively in relation to each other in one direction and symmetrically as a function of the spatial origin of the data with respect to the center position and as a function of one of the cutoff limits of a preedtermined time delay range for data in one channel with respect to data in another channel,
(d) time shifting the data in another path in each of the plurality of paths progressively in relation to each other in the other direction and symmetrically as a function of the spatial origin of the data with respect to the center posiiton and as a function of the other of the cutoff limits of the predetermined time delay range,
(e) and compositing all of the weighted and time shifted data to produce a composite output indicative of the presence, inside the predetermined time delay range, of the data in one channel having a time delay with respect to the data in another channel.

13. A method of indicating the presence, inside a predetermined time delay range, of a plurality of signals having a time delay with respect to one another, wherein each of the plurality of signals is a function of its spatial origin with respect to the spatial origin of each other signal, comprising the steps of:
(a) weighting each signal with respect to each other signal as a function of their respective spatial origins,
(b) bidirectionally time shifting each signal with respect to each other signal as functions of their respective spatial origins and the predetermined time delay range,
(c) and compositing all of the weighted and time shifted signals to produce a composite output indicative of the presence, inside the predetermined time delay range, of the plurality of signals having a time delay with respect to one another.

14. The method of claim 13, wherein the step of time shifting each signal includes time shifting the signals progressively in one direction with respect to each other and time shifting the signals progressively in the other direction with respect to each other.

15. The method of claim 13, wherein the step of time shifting each signal includes time shifting the signals progressively in one direction with respect to each other as a function of one of the cutoff limits of the predetermined time delay range and time shifting the signals progressively in the other direction with respect to each other as a function of the other of the cutoff limits of the predetermined time delay range.

16. A method of processing a plurality of signals obtained from sampling a phenomenon at separate locations on a line to indicate the presence, inside a predetermined velocity range, of a plurality of signals which are representative of the phenomenon having a velocity in the direction of the line, wherein each signal is a function of its spatial origin with respect to the center of the sample locations on the line, comprising the steps of:
(a) weighting each signal in relation to each other signal symmetrically as an inverse function of their respective spatial origins with respect to the center of the sample locations,
(b) separating each signal into a plurality of channels,
(c) time shifting the signals in one channel in each of the plurality of channels progressively in relation to each other in one direction and symmetrically as a function of their respective spatial origins with respect to the center of the sample locations and as a function of one of the cutoff limits of the predetermined velocity range,
(d) time shifting the signals in another channel in each of the plurality of channels progressively in relation to each other in the other direction and symmetrically as a function of their respective spatial origins with respect to the center of the sample locations and as a function of the other of the cutoff limits of the predetermined velocity range,
(e) and compositing all of the weighted and time shifted signals to produce a composite output indicative of the presence, inside the predetermined velocity range, of the signals which are representative of the phenomenon having a velocity in the direction of the line.

17. The method of claim 16, further including the step of time shifting each signal in relation to each other signal as a function of the center velocity of the velocity range so that any signals representing phenomenon having a velocity corresponding to the center velocity are shifted to have zero time delay between the signals.

18. The method of claim 14, further including the step of pairing signals having like weights and like time shifts applied thereto prior to separation into the plurality of channels.

19. The method of claim 16, wherein the weighted signals are each separated into the plurality of channels.

20. The method of claim 16, wherein the time shifted signals are each weighted.

21. A method for processing a plurality 2P of signals obtained from sampling a phenomenon at 2P equispaced separate locations on a line to preserve signals representing phenomenon having a velocity in the direction of the line inside a predetermined velocity range and attenuate signals representing phenomenon having a velocity outside said predetermined velocity range, wherein each signal is a function of its spatial origin with respect to the center of the sampling locations on the line, comprising the steps of:
(a) time shifting the 2P signals as a function of the center velocity of the predetermined velocity range so that any signals representing phenomenon having a velocity in the direction of the line corresponding to the center velocity are shifted to have zero time delay between signals,
(b) pairing signals which have spatial origins equally spaced from the center of the sampling locations thereby to result in P pairs of signals,
(c) separating each of the P pairs of signals into a plurality of channels,
(d) time shifting the signals in one channel of each of the plurality of channels progressively in relation to each other in one direction and symmetrically as a function of their respective spatial origins with respect to the center of the sample locations and as a function of one of the cutoff limits of the predetermined velocity range,
(e) time shifting the signals in another channel in each of the plurality of channels progressively in the other direction and symmetrically as a function of their respective spatial origins with respect to the center of the sample locations and as a function of the other of the cutoff limits of the predetermined velocity range,
(f) weighting each signal in relation to each other symmetrically as an inverse function of their respective spatial origins with respect to the center of the sample locations,
(g) polarity reversing the signals in said another channel in each of the plurality of channels,
(h) and compositing all of the weighted and time shifted signals to produce a composite output.

22. An apparatus for processing a plurality of signals obtained from sampling a phenomenon at separate locations on a line to produce an output representing the presence of phenomenon having a velocity in the direction of the line inside a predetermined velocity range, wherein each signal is a function of its spatial origin with respect to the center of the sample locations on the line, comprising delay means having delay channels therein, means for applying each signal to a plurality of sets of said delay channels with the delay means being adjustable to time shift a first signal in each of said sets as a function of their respective spatial origins and as a function of one of the cutoff limits of the predetermined velocity range, the delay means also being adjustable to time shift a second signal in each of said sets as a function of their respective spatial origins and as a function of the other of the cutoff limits of the predetermined velocity range, means for weighting the signals in each of said sets as a function of their respective spatial origins, and means for compositing the weighted and time shifted signals to produce said output.

23. The apparatus of claim 22, further including means for pairing the plurality of signals, prior to applying each signal to a plurality of channels in the delay means, to thereby apply signals having like time shifts and like weights to the same plurality of channels in the delay means.

24. The apparatus of claim 23, further including means for reversing the polarity of the signals in the other channel in each of the plurality of channels in the delay means.

25. A velocity filter process for treating a plurality of seismic traces detected at spaced points in a seismic array and resulting from a seismic disturbance, which comprises:
   (a) generating at least one pair of signals corresponding with each of said traces,
   (b) advancing one signal in each said pair and delaying the other signal in each said pair in proportion to the distance between a reference point in said array and the point of detection of seismic waves represented by the given pair of signals,
   (c) weighting the time shifted signals in relation to said distance,
   (d) reversing the polarity of one signal in each pair, and
   (e) summing said signals.

26. A system for velocity filtering a plurality of seismic traces from a reproducible recording representing seismic waves detected at spaced points along a seismic array, which comprises:
   (a) means for playback of said recording including means to generate at least one pair of signals corresponding with each of said traces,
   (b) time advancing and delaying means for advancing one signal in each said pair and for delaying the other signal in each said pair, respectively, in proportion to the distance between a reference point and said array and the point of detection of seismic waves represented by a given pair of signals,
   (c) attenuating means for attenuating said signals in proportion to said distance,
   (d) means for reversing the polarity of one signal in each pair, and
   (e) means for summing all of said signals.

References Cited by the Examiner

UNITED STATES PATENTS

| | | | |
|---|---|---|---|
| 3,136,974 | 6/1964 | Sirks | 340—15.5 |
| 3,142,815 | 7/1964 | Picou | 340—15.5 |

BENJAMIN A. BORCHELT, *Primary Examiner.*

R. M. SKOLNIK, *Assistant Examiner.*